(12) United States Patent
Sun

(10) Patent No.: US 7,913,293 B2
(45) Date of Patent: Mar. 22, 2011

(54) METHOD AND COMMUNICATION UNIT FOR COMMUNICATING BETWEEN COMMUNICATION APPARATUSES

(75) Inventor: Hongyu Sun, Shenzhen (CN)

(73) Assignee: Tencent Technology (Shenzhen) Company Ltd., Shenzhen (CN)

( * ) Notice: Subject to any disclaimer, the term of this patent is extended or adjusted under 35 U.S.C. 154(b) by 713 days.

(21) Appl. No.: 11/954,931

(22) Filed: Dec. 12, 2007

(65) Prior Publication Data

US 2008/0175383 A1    Jul. 24, 2008

Related U.S. Application Data

(63) Continuation of application No. PCT/CN2006/001364, filed on Jun. 16, 2006.

(30) Foreign Application Priority Data

Jun. 17, 2005  (CN) .......................... 2005 1 0076855

(51) Int. Cl.
*H04L 9/32*    (2006.01)
*G06F 9/00*    (2006.01)
*H04L 9/00*    (2006.01)

(52) U.S. Cl. .................... 726/2; 726/3; 726/11; 726/13; 713/150

(58) Field of Classification Search .................. 726/2–4, 726/11–15; 713/150, 153–154, 163, 168–170; 380/255
See application file for complete search history.

(56) References Cited

U.S. PATENT DOCUMENTS 6,219,710 B1 * 4/2001 Gray et al. .................... 709/227

FOREIGN PATENT DOCUMENTS

| CN | 1291034 | 4/2001 |
|---|---|---|
| CN | 1527621 | 9/2004 |
| CN | 1527623 | 9/2004 |
| CN | 1549613 | 11/2004 |

OTHER PUBLICATIONS

International Preliminary Report on Patentability for International Application No. PCT/CN2006/001364, dated Dec. 17, 2007.
International Search Report for International Application No. PCT/CN2006/001364, dated Oct. 19, 2006.
Written Opinion for International Application No. PCT/CN2006/001364, dated Oct. 19, 2006.
He et al., "Research on Using UDP to Traverse NA T Under P2P Network Environment," *Journal of JLN University*, 21(3):275-279 (2003). Abstract Only.
Hong-zhen et al., "Research of the Technology to Implement P2P Communication Across Middlebox," *Middlebox P2P*, 220-224 (2005). Abstract Only.
Jidong et al., "Research on a Multistage P2P File Transmission System Architecture," *Journal of UEST of China*, 33(4):430-433 (2004). Abstract Only.

* cited by examiner

*Primary Examiner* — Hosuk Song
(74) *Attorney, Agent, or Firm* — Marshall, Gerstein & Borun LLP

(57) ABSTRACT

The present invention discloses a method for communicating between communication apparatuses and a communication unit. The method includes: sending, by a first communication apparatus, a first request for establishing a Peer to Peer (P2P) connection to a second communication apparatus through a server; initiating, by the first communication apparatus or the second communication apparatus, a command for establishing a P2P connection with the other side; establishing directly a P2P channel between the first communication apparatus and second communication apparatus based on the command for establishing a P2P channel and transmitting data packets over the P2P channel. In the present invention, a P2P channel is directly established between the communication apparatuses to communicate, so data can be forwarded without a server. Thus, the load of the server may be reduced and information interaction rate of users may be improved.

12 Claims, 2 Drawing Sheets

METHOD AND COMMUNICATION UNIT FOR COMMUNICATING BETWEEN COMMUNICATION APPARATUSES

CROSS-REFERENCE TO RELATED APPLICATIONS

This is a continuation of International Application No. PCT/CN2006/001364 filed Jun. 16, 2006, which claims the priority benefit of Chinese Patent Application No. 200510076855.3, filed Jun. 17, 2005, the entire respective disclosures of which are incorporated herein by reference.

FIELD OF THE INVENTION

The present invention relates to computer and communication technologies, and particularly, to a method and communication unit for communicating between communication apparatuses.

BACKGROUND OF THE INVENTION

With the development of Internet technologies, many Internet-based applications come forth, such as network games based on Internet and Instant Messaging, and requirements of the applications on transmission rate have been raised continuously. Since the modes of the Browser/Server (B/S) and Client/Server (C/S) structures are the main mode in the Internet, and in these modes, a server must be set in the network and information is transmitted through the server in the network, the requirements of the Internet-based applications on the processing speed of the server also have been raised continuously. In this case, fluency and effect of an Internet-based application are affected if the network rate is slow. Therefore, the Peer to Peer (P2P) technology called peer connection or peer network connection is adopted generally for the implement of the Internet-based application.

Two communication modes, Transfer Control Protocol (TCP) and User Datagram Protocol (UDP), may be adopted in P2P. In general, for an application in which a data packet is required to reach the destination as soon as possible, such as the on-line games of keyboard type with high antagonism, UDP mode is adapted to implement the P2P communication.

In practical, infrastructure of servers in the Internet is established in the manner of multiple Internet Data Centers (IDCs). By this manner, a user is led to access a server with which the user may connect at a high rate and employs a Client-Server-Client (CSC) mode to communicate. In general, for an application employing the above UDP mode to implement the P2P communication, especially for an on-line game, as long as the network rate between a user and the server is fast, the application fluency can be guaranteed. However, since the data between users need to be forwarded through a server, the data amount of the server is very large and the load of the server is very heavy. As a result, the information interaction rate of users may become slow.

SUMMARY OF THE INVENTION

The present invention provides a method for communicating between communication apparatuses so as to reduce the load of a server and improve the information interaction rate of users.

In addition, the present invention also provides a communication unit for communicating between communication apparatuses so as to reduce the load of a server and improve the information interaction rate of users.

The method for communicating between communication apparatuses in accordance with the present invention includes:
sending, by a first communication apparatus, a first request for establishing a P2P connection to a second communication apparatus through a server;
initiating, by the first communication apparatus or the second communication apparatus, a command for establishing a P2P connection with the other side;
establishing a P2P channel between the first communication apparatus and second communication apparatus based on the command for establishing a P2P channel; and
transmitting data packets over the P2P channel.

The communication unit in accordance with the present invention includes:
a first interface, adapted to receive a data packet sent by an application of the communication apparatus to which the first interface belongs, and send a data packet from a network to the application of the communication apparatus to which the first interface belongs;
an encoding and decoding module, adapted to encode data sent to the network through the first interface and decode data sent to the first interface;
a second interface, adapted to send encoded data to the network and send the data received from the network to the encoding and decoding module;
a first communication module, adapted to control information and mode of communication between the communication apparatus to which the first communication module belongs and a server in the network;
a second communication module, adapted to control information and mode of communication between the communication apparatus and another communication apparatus connected with the communication apparatus over a P2P connection.

It can be seen that in the present invention, a P2P channel for communication is directly established between the communication apparatuses after a request for establishing a P2P channel between the communication apparatuses is forwarded through a server. Hence data can be forwarded without the server so as to reduce the load of the server and improve the information interaction rate of users.

EMBODIMENTS OF THE INVENTION

The present invention is hereinafter further described with reference to the attached drawings and specific embodiments.

To settle the problem in the prior art, an embodiment of the present invention provides a method for communicating between communication apparatuses. In the method, firstly, a first communication apparatus in the network sends a request for establishing a P2P connection to a second communication apparatus through a server. Secondly, either the first communication apparatus or the second communication apparatus initiates a command for establishing a P2P channel with the other side. Finally, a resource control apparatus in the network establishes a P2P channel between the first communication apparatus and second communication apparatus so as to communicate in the UDP mode between the first communication apparatus and second communication apparatus. Thus, after the P2P channel between the first communication apparatus and second communication apparatus is established, data sent from either of the two communication apparatuses to the other side is not forwarded by the server any longer. Thus, the load of the server is reduced and the response rate of information interaction may be improved.

A communication apparatus in a network may be located in a public network or be located behind a firewall of a private network. Moreover, a communication apparatus located in a private network can receive a data packet sent from a public network only after establishing a mapping relation between the private network address and the public network address in the gateway between the pubic network and the private network. Therefore, the communication apparatus located in the private network may send a request for establishing a P2P channel to the other side to for example establish the mapping relation between the private network address and the public network address in a gateway between the public network and the private network, no matter whether the communication apparatus initiatively requests the other side to establish a P2P channel or is requested to establish a P2P channel. After this, the communication apparatus can establish a P2P channel with another communication apparatus.

Figure 1:
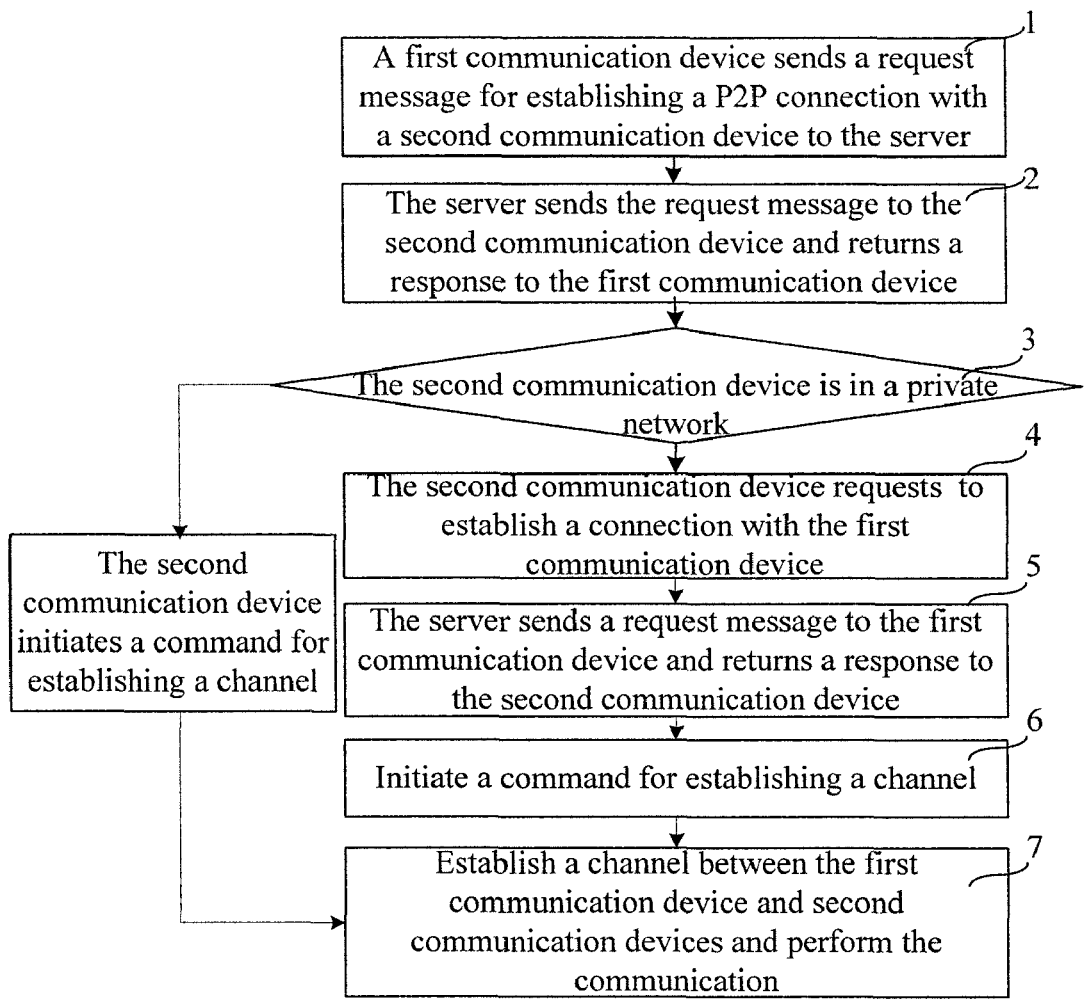
FIG. 1 shows a flow chart of the method for establishing a P2P channel between communication apparatuses and communicating in accordance with an embodiment of the present invention.

As shown in FIG. 1, the process of establishing a P2P channel between a first communication apparatus and second communication apparatus and transmitting data over the P2P channel in accordance with the embodiment of the present invention is described as follows.

Block 1: the first communication apparatus sends a request for establishing a P2P channel with the second communication apparatus to the server.

At this block, if the first communication apparatus is located in a private network, the request sent by the first communication apparatus should contain address information of the first communication apparatus, i.e., a private network IP address and port number of the first communication apparatus.

Figure 2:
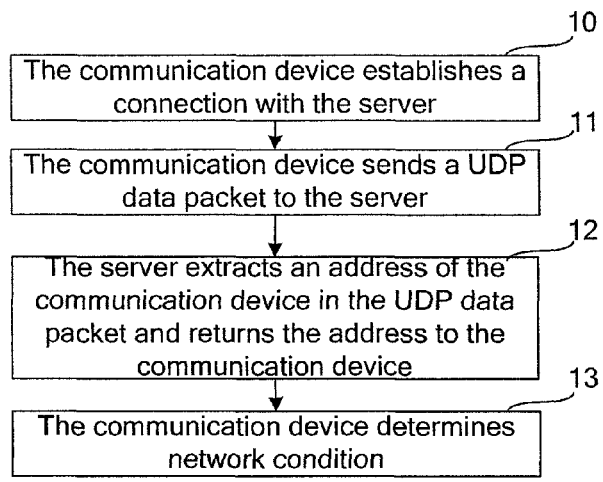
FIG. 2 shows a flow chart of the method for a communication apparatus judging its network condition in accordance with an embodiment of the present invention.

Therefore, the first communication apparatus needs to know whether it is a communication apparatus in a public network or a communication apparatus in a private network firstly. Since after a communication apparatus accesses a server in the communication system, the server may acquire address information of the communication apparatus such as an IP address and port number, the communication apparatus can know that whether it is located in a public network or a private network by sending a data packet to the server. As shown in FIG. 2, the process includes blocks as follows.

Block 10: the communication apparatus establishes a connection to the server.

Block 11: the communication apparatus sends a UDP data packet for acquiring the network condition of the communication apparatus to the server.

If the communication apparatus is a communication apparatus in a private network, the UDP data packet sent to the server from the communication apparatus must pass a gateway between a public network and the private network. When forwarding the UDP data packet, the gateway replaces the private network IP network and port number contained in the UDP data packet with a public network IP address and port number of the gateway, and then forwards the replaced data packet to the server.

Block 12: after receiving the UDP data packet of the communication apparatus, the server extracts a source IP address and port number in the received data packet, i.e., an IP address and port number that the server knows, and sends a data packet carrying the IP address and port number to the communication apparatus.

In this block, for a UDP data packet from a communication apparatus in the pubic network, the IP address and port number of the communication apparatus that the server knows include the public network IP address and port number of the communication apparatus. While for a UDP data packet from a communication apparatus in the private network, the IP address and port number of the communication apparatus that the server knows include the public network IP address and port number of the gateway which connects the communication apparatus to the public network.

Block 13: the communication apparatus extracts the IP address and port number in the data packet sent by the server, compares the extracted IP address and port number with the IP address and port number of the communication apparatus, determines that the communication apparatus is located in the public network if the extracted IP address and port number are same as the IP address and port number of the communication apparatus, and otherwise, determines that the communication apparatus is located in the private network.

With the above method, the communication apparatus may know whether it is a communication apparatus in the public network or a communication apparatus in the private network.

Block 2: the server forwards the request to the second communication apparatus and returns a response to the first communication apparatus.

Block 3: after the second communication apparatus receives the request, if the second communication apparatus is located in a private network, perform Block 4, otherwise, the second communication apparatus initiates a command for establishing a P2P channel to the first communication apparatus based on the address of the first communication apparatus in the request.

The second communication apparatus may also determine whether it is located in the public network or in the private network with the method of Blocks 10-13 shown in FIG. 2.

Block 4: the second communication apparatus sends a request for establishing a P2P channel with the first communication apparatus to the server.

In this block, the request sent by the second communication apparatus should contain address information of the second communication apparatus, i.e., private network IP address and port number of the second communication apparatus.

Block 5: the server sends the request sent by the second communication apparatus to the first communication apparatus and returns a response to the second communication apparatus.

Block 6: the first communication apparatus initiates a command for establishing a P2P channel to the second communication apparatus based on the address of the second communication apparatus in the received request.

The first communication apparatus can directly initiate the command for establishing a P2P channel at this block, since the first communication apparatus has established the mapping relation between its private network address and public network address in the gateway by sending the request to the server at Block 1.

As an alternative solution to Block 6, after sending the request, the second communication apparatus may initiate the command for establishing a P2P channel to the first communication apparatus based on the address of the first communication apparatus in the request received by the second communication apparatus.

Block 7: the resource control apparatus in the network establishes a P2P channel directly between the first communication apparatus and second communication apparatus, and the first communication apparatus and second communication apparatus transmit UDP data packets over the channel.

At Block 7, if both the first communication apparatus and second communication apparatus are in a same private network, the channel may be established in the private network.

In the above process of establishing the P2P channel, once sending the command for establishing a P2P channel, the first communication apparatus or second communication apparatus may start to send a testing data packet to the other side immediately so as to determine whether the P2P channel has been established. After receiving a test packet, the receiving side returns a response, and then after receiving the response, the sending side sends a confirming message indicating a P2P channel has been established. After that, data starts to be transmitted.

The UDP method is non-connection oriented. Thus, the transmission order of data packets cannot be ensured in the network. Moreover, a great number of packets will be lost when the network is busy. As a result, the fluency and effect of an application cannot be ensured. In order to ensure reliability of receiving a UDP data packet in the data transmission process, retransmission scheme is introduced in another embodiment of the present invention. That is, when the first communication apparatus and second communication apparatus transmit a data packet over the P2P channel, the receiving side extracts a serial number in the packet head, compares the extracted serial number with serial numbers of data packets received before and after to determine whether there is a lost packet and determine which data packet has not been received, and if there is a lost packet, the receiving side requests the other side to retransmit the data packet.

Since the communication apparatus which receives data may also need to send data to the other side, a message for requesting the other side to retransmit a data packet and information identifying the data packet to be retransmitted by the other side are carried in a data packet sent to the other side, so as to save network bandwidth, reduce probability of network congestion and improve communication quality.

In the case that information of a lost packet is carried in a data packet to be sent, two bytes is added into the packet head of the data packet. One of the two bytes is used for identifying states of 8 data packets in back of a lost data packet with the minimum serial number, and the other byte is used for identifying states of 8 data packets in front of a lost data packet with the maximum serial number. This is because when there is a lost data packet, it indicates that the network may be congested, loss possibilities of the continuous multiple data packets in back of the lost data packet with the minimum serial number are large, and these data packets are also closely associated with each other in general. So, one byte is used for indicating receiving states of the subsequent 8 data packets so as to determine which data packet needs to be retransmitted. Similarly, loss possibilities of the continuous multiple data packets in front of the lost data packet with the maximum serial number are large, and these data packets are also closely associated with each other in general. The data packet with the maximum serial number represents the latest message while the wait for the data packet with the minimum serial number is long; therefore, the retransmission priorities of these data packets are high. Thus, one byte is used for identifying the states of 8 data packets so as to determine which data packet needs to be retransmitted, so as to avoid the transmission of serial numbers of data, so the packet head of a data packet can be as small as possible, and the included information amount of the packet head can be as large as possible. Of course, more bytes such as 4 bytes may be added into a packet head as demanded, and the processing is similar.

The above method is especially applicable to on-line games. For games of keyboard type with high antagonism, high network rate is required and data is required to reach the destination as soon as possible. Hence, through a P2P channel to transmit a UDP data packet directly between game terminals and the retransmission scheme jointly, reliability of message transmission is ensured, game fluency and information interaction rate may be improved greatly, and thus the shortage in the prior art due to a server forwarding the data is covered.

Figure 3:
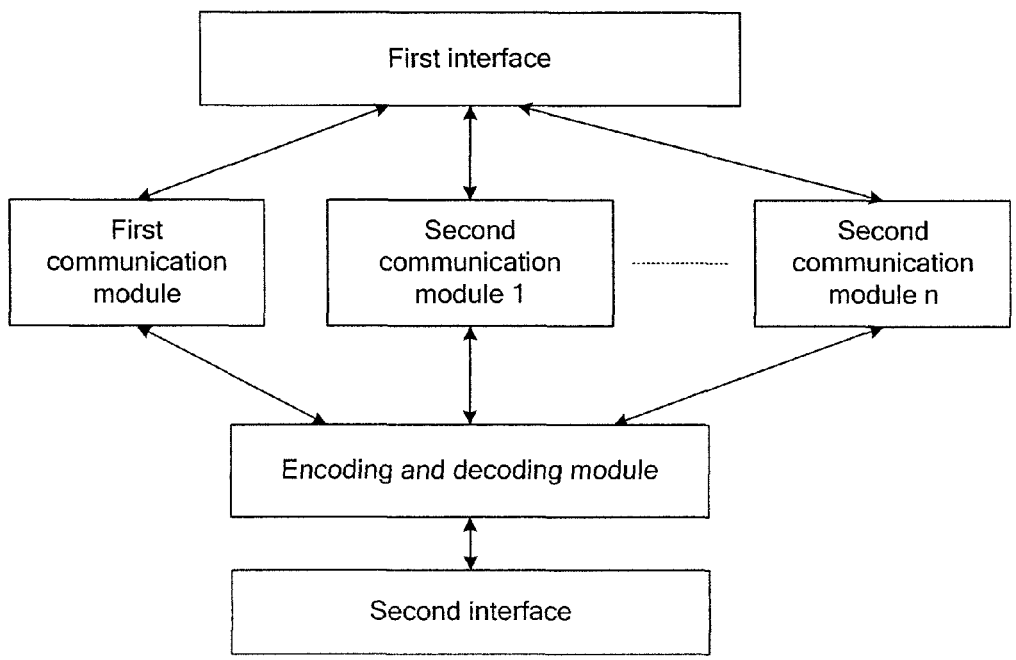
FIG. 3 shows a schematic diagram illustrating the internal structure of the communication unit in accordance with an embodiment of the present invention.

Besides the method for communicating between communication apparatuses, another embodiment of the present invention also provides a communication unit located in a communication apparatus in a network. As shown in FIG. 3, the communication unit includes: a first interface, a second interface, an encoding and decoding module, a first communication module and a second communication module.

The first interface is also called an application layer interface and adapted to receive data sent to the network from an application of the communication apparatus to which the first interface belongs, and send data from the network to the application of the communication apparatus.

The encoding and decoding module is adapted to encode the data sent to the network through the first interface and may further encrypt the data to be sent. The encoding and decoding module is also adapted to decode the data sent to the first interface from the network, and may further decrypt the data correspondingly if the received data have been encrypted.

The second interface is also called a Socket interface and adapted to send encoded data to the network and send the data received from the network to the encoding and decoding module.

The first communication module is connected between the first interface and the encoding and decoding module and adapted to control information and mode of communication between the communication apparatus and a P2P server in the network.

In general, when a communication apparatus wants to communicate with another communication apparatus, the communication apparatus must log in a P2P server in the network first. The P2P server has a fixed public network IP address and is adapted to provide the service of establishing a P2P channel between communication apparatuses. The first communication module, by interacting with a P2P server, can acquire address information of every communication apparatus connected to the P2P server.

The second communication module is connected between the first interface and the encoding and decoding module and adapted to control information and mode of communication between the communication apparatus and another communication apparatus connected with the communication apparatus over a P2P connection, and acquire the address information of every communication apparatus from the first communication module.

It is to be noted that there may be more than one second communication modules in the above communication unit and each second communication module is adapted to control communication between the communication apparatus and one of other communication apparatuses.

In a communication system including multiple communication apparatuses with the above communication unit, when an application of a communication apparatus sends data to another communication apparatus in the network, the process of sending data includes steps as follows. Firstly, the application sends the data to the first interface of the communication unit. Since ID information of another communication apparatus is included in the data sent by the application, after receiving the data, the first interface sends the data to a designated second communication module based on the included ID information of the communication apparatus. The designated second communication module acquires destination address and related information of the data to be sent through the second communication module and the first communication module, and then invokes the encoding and decoding module to encode the data, or possibly further to encrypt the data. Finally, the second interface sends the encoded data to the network.

When the communication unit in a communication apparatus receives data from the network, the process of receiving data includes blocks as follows. The communication unit acquires the data through the second interface, and sends the received data to the encoding and decoding module for decoding and possibly further for decrypting. Then the decoded data is sent to the application of the communication apparatus through a designated second communication module and the first interface.

Although communication apparatuses are distributed randomly in the network and do not know information of each other, and thus communication apparatuses cannot establish a P2P channel directly, with the above communication unit, the communication apparatuses may first acquire the information of each other through a server and then establish a P2P channel directly.

It is obvious that those skilled in the art may make various modifications and alternations to the present invention without departing from the spirit and scope of the present invention. Thus, such modifications and alterations in the scope of the claims of the present invention and the equivalent technologies thereof are intended to be contained in the present invention.

The invention claimed is:

1. A method for communicating between communication apparatuses, the method comprising:
sending, by a first communication apparatus, a first request for establishing a Peer to Peer (P2P) connection to a second communication apparatus through a server;
initiating, by the first communication apparatus or the second communication apparatus, a command for establishing a P2P connection with the other side;
establishing a P2P channel between the first communication apparatus and second communication apparatus based on the command for establishing a P2P channel;
transmitting data packets over the P2P channel;
wherein initiating the command comprises
determining, by the second communication apparatus, whether it is in a private network, after receiving the first request from the first communication apparatus,
sending a second request for establishing a P2P connection to the first communication apparatus through the server if it is in the private network, otherwise, initiating the command for establishing P2P channel with the first communication apparatus; and
wherein determining whether the second communication apparatus is in the private network comprises
sending, by the second communication apparatus, a message to the server,
extracting, by the server, address information of the second communication apparatus in the message and returning the address information to the second communication apparatus, and
determining, by the second communication apparatus, whether the received address information is the same as the address information of the second communication apparatus and determining that the second communication apparatus is in a private network if the received address information is not the same as the address information of the second communication apparatus.

2. The method of claim 1, wherein the first request for establishing a P2P channel contains private network address information of the first communication apparatus, if the first communication apparatus is in a private network.

3. The method of claim 1, wherein the second request for establishing a P2P channel contains private network address information of the second communication apparatus, if the second communication apparatus is in the private network.

4. The method of claim 1, wherein the P2P channel is established directly in a private network if the first communication apparatus and second communication apparatus are in the same private network.

5. The method of claim 1, wherein after the P2P channel is established, the communication apparatuses on both ends of the P2P channel send a test data packet to the other side separately so as to determine whether a P2P channel has been established successfully.

6. The method of claim 1, wherein the data packet includes a User Datagram Protocol (UDP) data packet.

7. The method of claim 1, wherein during transmitting of the data packets, the method further comprises:
extracting, by the receiving side of the data packet, a serial number in the data packet;
comparing the serial number with serial numbers of data packets has received and determining whether there is a lost packet; and
requesting the sending side of the data packet to retransmit a lost data packet if there is a lost data packet.

8. The method of claim 7, wherein the requesting to retransmit the lost data packet comprises:
carrying, by the receiving side of the data packet, a retransmission message and information of a data packet to be retransmitted in a data packet sent to the sending side of the data packet.

9. The method of claim 8, wherein the carrying the retransmission message and information comprises:
adding one or more bytes into the packet head of the data packet, wherein the one or more bytes identify states of one or more data packets in back of a lost data packet with the minimum serial number and identify states of one or more data packets in front of a lost data packet with the maximum serial number; and
determining, by the communication apparatus receiving the data packet, a data packet to be retransmitted based on the states.

10. A communication unit, located in a communication apparatus in a network, comprising:
a first interface, adapted to receive a data packet sent by an application of the communication apparatus to which the first interface belongs, and send a data packet from the network to the application of the communication apparatus to which the first interface belongs;
an encoding and decoding module, adapted to encode data sent to the network through the first interface and decode data sent to the first interface;

a second interface adapted to send encoded data to the network and send the data received from the network to the encoding and decoding module;

a first communication module, connected between the first interface and the encoding and decoding module and adapted to control information and mode of communication between the communication apparatus to which the first communication module belongs and a server in the network; and a second communication module, connected between the first interface and the encoding and decoding module and adapted to control information and mode of communication between the communication apparatus and another communication apparatus connected with the communication apparatus over a P2P connection.

11. The unit of claim 10, wherein there are multiple second communication modules.

12. The unit of claim 10, wherein the encoding and decoding module is further adapted to encrypt the encoded data and decrypt data from the second interface before the data are decoded.

* * * * *